United States Patent [19]
Novice

[11] 3,785,851
[45] Jan. 15, 1974

[54] HOT END COATING DEVICE
[75] Inventor: Michael A. Novice, Elmira, N.Y.
[73] Assignee: Dart Industries Inc., Los Angeles, Calif.
[22] Filed: July 1, 1971
[21] Appl. No.: 158,751

[52] U.S. Cl................. 117/54, 117/94, 117/105, 117/105.1, 117/106 R, 117/107.2 R, 117/124 A, 117/124 T, 117/124 B, 117/124 C, 117/211, 117/DIG. 2
[51] Int. Cl................. C03c 17/06, C23c 11/02
[58] Field of Search............ 117/105.1, 105, 105.2, 117/107, 107.2 R, 124 A, 124 T, 124 B, 124 C, 106 R, 54

[56] References Cited
UNITED STATES PATENTS

| | | | |
|---|---|---|---|
| 2,877,138 | 3/1959 | Vodonik | 117/124 B |
| 2,065,218 | 12/1936 | Garesche | 117/105.1 |
| 2,700,365 | 1/1955 | Pawlyk | 117/105.1 |
| 2,831,780 | 4/1958 | Deyrup | 117/124 T |
| 2,505,530 | 4/1950 | Davis | 117/105.1 |
| 3,381,023 | 4/1968 | Whiting | 117/107.2 R |
| 1,931,380 | 10/1933 | Haber | 117/106 R |
| 2,375,482 | 5/1945 | Lyle | 117/106 R |

OTHER PUBLICATIONS
Vapor Plating by Powell, Campbell & Gonser. John Wiley & Sons 1955 pgs 26–28.

Primary Examiner—Murray Katz
Assistant Examiner—M. Safocleous
Attorney—Kenneth J. Hovet, Leigh B. Taylor and Paul R. Wylie

[57] ABSTRACT

The coating method comprises introducing a coating material into an air stream above the pyrolysis temperature of the coating material and directing the air stream at the vitreous surface. The vitreous surface is at a temperature above the pyrolysis temperature of the selected coating material. The apparatus includes an electrical filament heated to a temperature from about 500°F to about 2,000°F. A source of air is blown over the electrical filament and heated to a temperature of from about 400°F to about 1,800°F. The coating material is introduced into the air stream which is then directed at the vitreous surface.

5 Claims, 5 Drawing Figures

INVENTOR.
MICHAEL A. NOVICE
BY
Michael L. Dunn
ATTORNEY

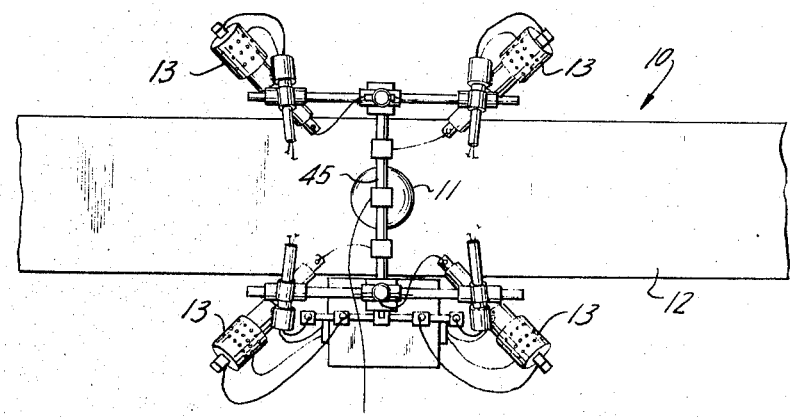
FIG. 3
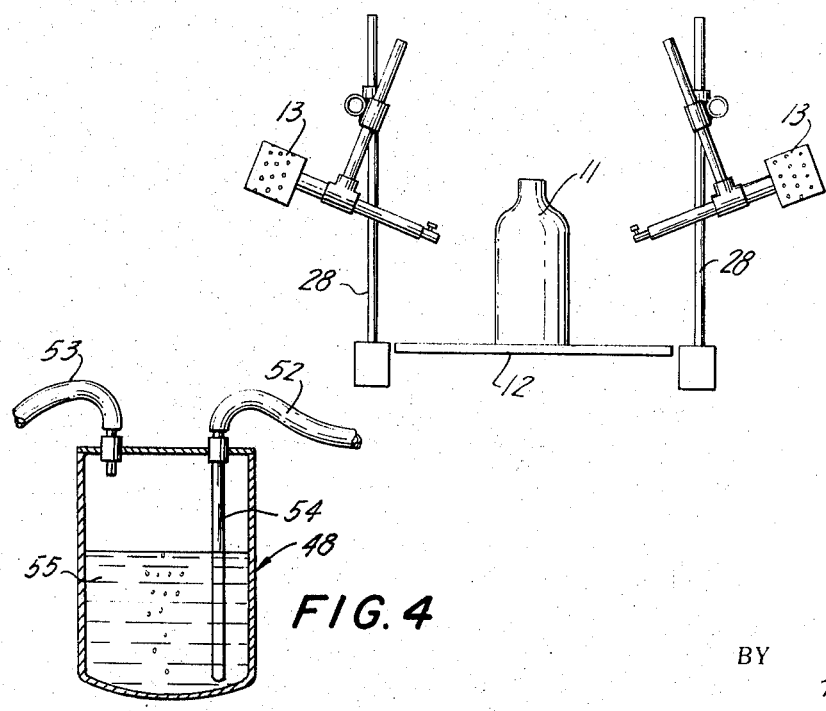
FIG. 5
FIG. 4
INVENTOR.
MICHAEL A. NOVICE
BY
Michael L. Dunn
ATTORNEY

HOT END COATING DEVICE

BACKGROUND OF THE INVENTION

1. Field of the Invention

This invention relates to a process for treating vitreous surfaces such as glass to enhance and alter the properties. In a more specific aspect the invention relates to a method for coating and treating glass containers.

2. Description of Prior Art

In the prior art coatings have been applied to surfaces, particularly vitreous surfaces such as glass, for various purposes. Some of the purposes for which coatings have been applied to glass are: to promote adhesion between the glass and another substance, to color the glass or facilitate the acceptance of color by the glass, to improve the abrasion or scratch resistance of the glass, to control the reflectance of the glass, to control the wetting properties of the glass, to facilitate the formation of mirrors, to form an electrically conducting surface on the glass, and to increase the strength, durability and corrosion resistance of the glass.

Glass derives its strength from an unblemished surface and any scratches or flaws which are present on its surface decreases its strength many fold. Generally, glass articles of commerce have their maximum strength as soon as they are formed and this strength decreases as the articles come into contact with each other, and with other surfaces.

One reason for coating a glass surface is therefore to provide good scratch resistance or abrasion resistance which decreases the likelihood of breakage. More bottles can therefore be handled by filling and packaging apparatus in the same amount of time merely by spacing the bottles closer together and increasing the speed of the conveyors, even though the glass surfaces will be subject to more contact with other surfaces. Also since many products are packaged under pressure, for example, carbonated beverages, it is very desirable that the surface of the glass container have as few scratches as possible to minimize the possibility of breakage.

Another reason for coating glass surfaces is to provide on the glass or other electrically non-conductive surface a thin transparent coating or film possessing the property of electrical conductivity, which coatings are clear, hard and tenacious and of uniform thickness; which are in intimate contact with the glass or other surface; and which will retain these properties under adverse conditions.

An electrically conducting coating or glass may be employed for a variety of purposes such as, making burglar alarms, heating elements, electrical resistors and semi-conductors. A special use is the application of the conducting glass for glazing the windshields in airplanes and other aircraft, although it may be advantageously employed for glazing windows whenever clear vision is required under adverse weather conditions.

Glass surface are also coated to give color to glass. For example, by the use of coloring oxides corresponding shades of a permanent character are imparted to glass fibers. By the use of various combinations of coloring oxides, different shades and color blends may be obtained. When the reaction between the metal oxides and glass surfaces leaves a substantially colorless product, permanent color can still be developed, because it appears that the resulting surfaces provide sufficient physical anchorage for conventional coloring agents, such as dyes, which may then be applied by techniques common in the textile trade.

Coatings upon glass are used to improve the adhesion of glass to materials such as polymers. For example, a metal compound may be coated upon the exterior surface of a glass container and thereafter the surface may be coated with a cured resinous composition. The metal compound acts as an anchoring or bonding agent between the exterior surface of the container and subsequently applied resin coatings; and the cured coating provides a mar resistant, inert film over the bottle exterior.

While not wishing to be bound by any particular theory it is believed that there is present on the bottle surface OH or ONa groups; and that these groups dissociate from the glass when contacted with water which has permeated an organic, resinous film on the bottle surface causing the film to lose its adhesion to the surface. During the deposition of the metal compound on the container exterior, the potentially dissociable groups thereon are removed or inactivated in some manner. The metal compound forms on and adheres to the glass surface in a multitude of connected, tiny nodules. These nodules are not hydrophilic but organophilic and provide anchoring areas to which the subsequently applied organic resin coating can firmly attach itself.

Coatings have been formed using metallic compounds which are high reflecting and, in addition, evenly wettable with water in the first instance but nonwettable after washing and drying.

Because of these characteristics, such films are readily adaptable to a large number of uses. They can be applied to opaque glass to produce very desirable non-glass rear vision mirrors for automobiles. When formed on transparent glass surfaces, a transparent or one-way mirror results, and on transparent glass tableware, they serve to enhance both the beauty and utility of the pieces. Since the film can uniformly wet with water, on the first application after fliming, they are valuable as an intermediate coating in silvering, and because of their subsequent non-wettability they are useful on windows to improve the ability of the glass to shed water and on outdoor insulators to prevent the formation of electric ally conducting moisture films.

The following metals or their compounds have been used for one or more of the above reasons: aluminum, antinomy, arsenic, barium, beryllium, bismuth, boron, cadmium, calcium, chronium, cobalt, columbium, copper, gallium, germanium, gold, indium, iron, lead, molybdenum, magnesium, manganese, mercury, nickel, phosphorous platinum, potassium, selenium, silicon, silver, sodium, strontium, sulfur, thallium, tellurium, thorium, tin, titanium, tungsten, uranium, vanadium, zinc and zirconium.

Although it is known in the art that the above elements or their compound can be used for one or more of the above reasons, the method of application known in the prior art are often insufficient.

The most common method of applying a metallic compound to the surface of a vitreous substance is to spray a metal containing compound or solution or an emulsion of a metal containing compound onto the vitreous surface while the surface is hot. The spray method of application generally causes stresses in the vitreous substance, creates a coating which is not uniform and which has lower scratch resistance than coating applied by other methods.

It has been proposed that a metal containing compound could be sprayed onto the glass surface at the cold end of the glass forming line. This method of application is inadequate as the sole method for applying a metal containing compound to a vitreous article such as a glass bottle. It is necessary that the article such as a glass bottle be protected throughout the processing of the article. A coating applied at the cold end of the processing line will provide no protection for the bottle during processing. And stresses resulting from coating solely at the cold end will not be reduced by upstream annealing.

It has been suggested that the surface of glass could be coated with colloidal metal containing compounds. The glass would then be heated so the colloidal compound would combine with the glass surface. This method of applying a coating to glass has proven to be deficient in that non-uniform uneven coatings are obtained.

In the prior art, attempts were made to coat glass by immersing the warm glass article in a liquid containing metal or a metal containing compound. Immersing of a warm or hot vitreous substance such as glass in a liquid can cause stresses and in addition coatings formed by immersing an article in the liquid were not uniform.

The method which provides the most uniform coating on a vitreous surface involves exposing the vitreous substance such as glass to a vapor of a metal containing compound. Vapors cannot easily be applied in open air to the surface of a glass article since loss of vapor to the atmosphere is expensive and since there is a complete lack of control of vapor concentration. Furthermore, vented metallic vapors are considered pollutants. In the prior art, it was necessary that the vapors be applied in an enclosed chamber and the use of the enclosed chamber was not suitable for continuous operation since batch processing slowed production and jamming occurred in the hood when attempts were made to convey the article through the chambers. Even in an enclosed chamber concentration control was difficult. One of the major disadvantages of using the vapor method of applying a coating to a vitreous surface is that there is a lack of directional control, furthermore, a high scratch resistance is not easily provided by a coating applied by a vapor method without giving a highly reflective unaesthetic appearance to the surface of the bottle.

There is disclosed in the prior art, a method for applying a coating to a bottle by including metallic compounds in a combustible organic fluid in the presence of oxygen and directing the mixture at the hot bottle or other vitreous surface which then causes the combustible organic fluid to burn. The method disclosed was not suitable since frequently metallic oxide residue is formed upon the surface of the glass seemingly due to reaction of the metal with water formed by combustion of the organic fluid.

Furthermore, equipment frequently became clogged due to the reaction product of hydrolysis of the metallic compound with the water from combustion. These reaction products are also believed responsible for rough cloudy coatings. Efficiency of these prior art methods was low and high percentages of metallic vapors was wasted.

The flame type and other prior art hot end coating devices had even lower efficiencies when compounds were used, having high pyrolysis temperatures, which reacted readily with water or which had to be introduced into the flame, or other coating means in the solid or liquid phase. For these reasons, many compounds could not be effectively used commercially. For example, tin tetrachloride vaporized at a lower temperature than titanium tetrachloride and was somewhat less susceptable to rapid hydrolysis than titanium tetrachloride. Titanium tetrachloride was therefore not generally used commercially even though titanium tetrachloride causes less corrosion of metallic surfaces in contact with the coating, is easier to scrub out of waste gases to prevent pollution, and is a cheaper compound. Tin coatings on the other hand causes corrosion of bottle caps in contact with the coating resulting in pock marks and "twist off" caps which could not be twisted off. The tin tetrachloride was more expensive than titanium tetrachloride and it was harder to free the waste gases from tin compounds.

BRIEF DESCRIPTION OF THE INVENTION

The method for coating vitreous surfaces herein disclosed eliminated the problem of articles jamming in the coating hoods, reduces stresses in the vitreous article, gives a coated surface having high scratch resistance, permits the formation of a uniform coating, gives good directional control of the coating material, permits easy control of the concentration of coating material, permits the more efficient use of coating compounds than was possible using prior art methods, and reduces or eliminates troublesome hydrolysis products. These articles may be glass containers, glass sheets, ceramic articles or any other article having a vitreous surface.

Many of the above advantages were accomplished by means of the flame coating method; however, as discussed above trouble resulted from the combustion products of the flame. The present method retains all of the advantages of the flame method while eliminating problems resulting from combustion.

In accordance with this invention, a compound containing an element selected from the group consisting of aluminum, antimony, arsenic, barium, beryllium, bismuth, boron, cadmium, calcium, chromium, cobalt, columbium, copper, gallium, germanium, gold, indium, iron, lead, molybdenum, magnesium, manganese, mercury, nickel, phosphorous, platinum, potassium, selenium, silicon, silver, sodium, strontium, sulfur, thallium, tellurium, thorium, tin, titanium, tungsten, uranium, vanadium, zinc and zirconium, is introduced into an air stream which is preferably at a temperature above the pyrolysis or decomposition temperature of the compound, and the air stream is then directed at the vitreous surface to be coated. The compound or coating material is generally selected from $FeCl_3$, $TiCl_4$, and $SnCl_4$ and $TiCl_4$ or $SnCl_4$ have been found to be preferred. The vitreous surface to be coated is also preferably above the pyrolysis temperature of the selected compound.

The air is dry and may be heated by any means which will raise the temperature above the pyrolysis temperature of the selected compound without introducing foreign material such as water vapor into the air. The air is preferably heated by an electrical resistance heater although it may also be heated by other means such as an electrical arc or by heat from a separated flame.

IN THE DRAWINGS

FIG. 3 is a top view of the device shown in FIG. 1.

FIG. 4 is a cross sectional view of the tank shown in FIG. 1.

FIG. 5 is an alternative embodiment of the coating device having two coating guns.

PREFERRED EMBODIMENT

In the preferred embodiment of the invention, $TiCl_4$ and $SnCl_4$ are the preferred coating materials introduced into the hot air stream. These materials have a pyrolysis or decomposition temperature between 700° and 1,300°F and are generally almost completely pyrolysed when exposed for a brief interval to a temperature above 900°F. The stream of hot air for these compounds should preferably be at a temperature of between 700° and 1,800°F and the surface to be coated should be at a temperature of from about 400°F to about 1,800°F. Other temperature ranges may be required for other coating materials. The air is preferably heated by an electrical resistance heater similar to the Sylvania Serpentine Heater which has a heat transfer efficiency of about 90 percent.

The coating material is generally introduced into the hot air stream by means of a feed air stream carrying the coating material. The coating material may be in a powder or liquid form but is preferably in the vapor phase.

Figure 1:
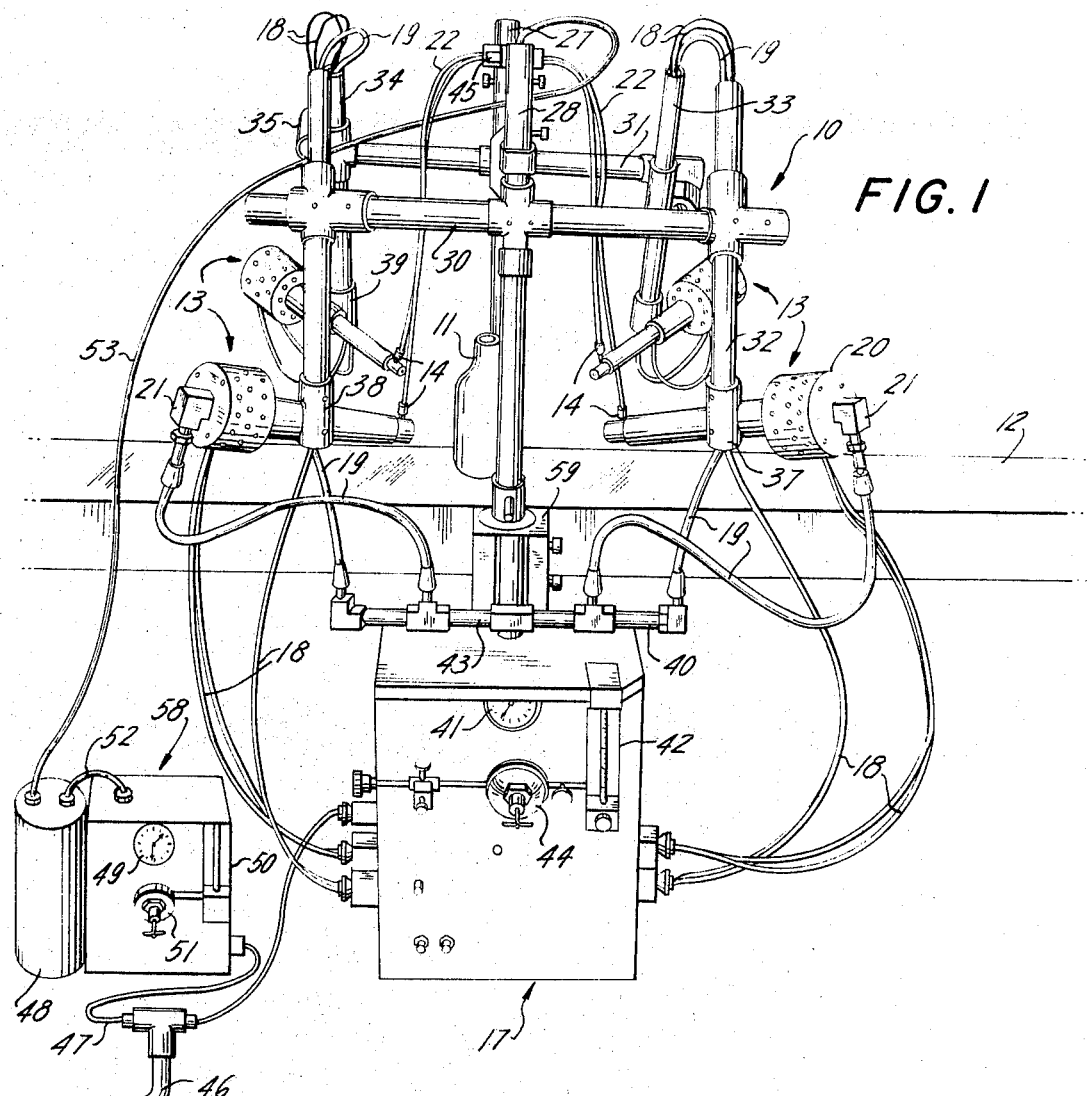
FIG. 1 is a front perspective view of a preferred embodiment of the coating device.
Figure 2:
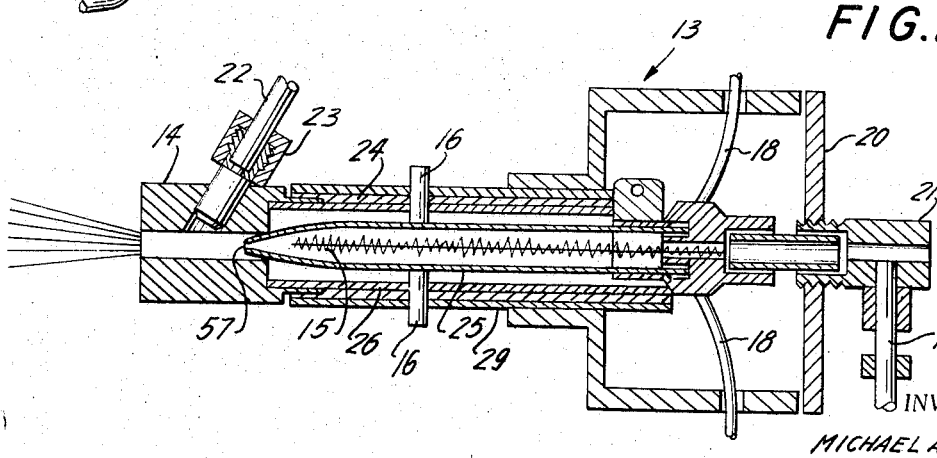
FIG. 2 is a cross sectional view of the gun portion of the coating device.

Referring now to the drawings, FIGS. 1 and 3 show a preferred embodiment of coating apparatus 10. Apparatus 10 is provided with a conveyor 12 for moving article 11 which may be a bottle into a position to permit article 11 to be coated. Gun 13 is aimed at article 11 and spray article 11 with coating material. As best seen in FIG. 2, gun 13 is connected to an air hose 19 by means of air hose coupling 21.

Gun 13 is further provided with a heating filament 15 to which are attached heater wires 18. Filament 15 is preferably manufactured from a high temperature ferrous alloy or tungsten and may be heated by electricity up to temperatures of over 2,000°F. The filament is preferably helical in shape and the helical turns vary in diameter along the length of the filament to increase the efficiency of heat transfer to gases passing over the filament. An example of such a filament is the Sylvania Serpentine coil available from Sylvania's Emmissive Products. The filaments will have a life of over 5,000 hours at a filament temperature of over 1,900°F. Filament 15 in the preferred embodiment is surrounded by quartz tube 25 which is open at both ends 56 and 57. In operation air passing through the quartz tube receives heat from the filament. When the filament is heated to 1,900°F, gas passing through the tube will reach temperatures as high as 1,700°F and when the filament reaches 2,000°F the gas temperature will reach 1,800°F. The temperature of the gas leaving the quartz tube will however drop rapidly as the heated gas stream passes through surrounding air at normal room temperature. At a distance of only seven inches from the quartz tube and filament, the temperature of the gas stream will drop as low as 300°F. Quartz tube 25 is protected by tube shield 26, end 56 of which is connected to air hose coupling 21. Quartz tube 25 is supported within quartz tube shield 26 in a spaced relationship to shield 26 by means of supports 16 and insulation 24. Insulation 24 also prevents loss of efficiency by loss of heat through the sides of quartz tube 25. At end 57 of tube 25, a nozzle 14 is provided having a feed line coupling 23 which connects feed line 22 to nozzle 14. Feed line 22 carried coating material to nozzle 14.

Surrounding quartz tube shield 26 and in spaced relationship thereto is outer cylindrical shell 29 which further assists in preventing heat loss from quartz tube 25 through the walls of the tube. Surrounding and protecting end 56 of quartz tube 25 is outer housing 20 which also permits the gun to be manually handled during operation without burning the operator's hands.

As seen in FIG. 1, the electrical and air supplies for gun 13 is controlled by control unit 17 which is provided with necessary switches and controls for regulating the flow of current through heater wires 18 to filament 15 and for controlling and monitoring the flow of air from main air supply hose 46 through quartz tube 25. In operation air from main air supply hose 46 enters control unit 17. The presence is then measured by pressure gauge 41 and after passing through control valve 44 the air flow is measured by flow meter 42. The air then enters air manifold 43 through coupling 40 to air hose 19 which provides the main air flow through quartz tube 25 around filament 15.

A second control unit 58 is provided for the feed air which carries the coating material to gun 13. A feed air supply hose 47 carries air from main air supply hose 46 to control unit 58. Control unit 58 measures the pressure by means of pressure gauge 49 and measures the flow rate by means of feed air flow meter 50. The flow of feed air may be adjusted by means of feed valve 51.

A tank inlet hose 52 carries air from control unit 58 to tank 48. As best seen in FIG. 4, tank inlet hose 52 is connected to dip tube 54 which extends below the surface of coating material 55 which is held in tank 48. In the preferred embodiment when feed air leaves dip tube 54 beneath the surface of coating material 55, the air bubbles through and vaporizes some coating material. If desired, the feed air as well as the coating material may be heated to increase vaporization of coating material. After bubbling through coating material 55, the feed air carrying vaporized coating material leaves tank 48 through outlet hose 53 which is connected to feed air manifold 45 as best seen in FIG. 3. Feed air carrying vaporized coating liquid then leaves manifold 45 through feed line 22 which is attached to nozzle 14. In nozzle 14, the feed air carrying coating material blends with the main air flow.

In the preferred embodiment, feed line 22 enters the nozzle 14 at an angle which permits the coating material to enter the air stream in a direction which compliments the flow of air through the nozzle as seen in FIG. 2. Various other methods of introduction are suitable. The coating material may for example be introduced into the main air stream before the air stream passes over the filament. This method of introduction is advantageous in that the coating material becomes more thoroughly blended with the main air or gas stream and the coating material is exposed to a high temperature for a longer period. The method has a disadvantage in that the filament life becomes somewhat reduced due to the presence of the material. Some of the other methods which have been used to introduce coating material into the heated gas stream are nebulizers and devices for introducing drops of liquid material. The rapid velocity of the heated air has also been used to create a vacuum to suck material into the heated air stream.

In the preferred embodiment shown in FIG. 1, guns 13 are attached to arms 32, 33, 34 and 35 by means of holders 36, 37, 38 and 39. Arms 32 and 35 are supported by cross bar 30 and arms 33 and 34 are supported by cross bar 31. Cross bar 30 is held in a horizontal position by upright 27 and cross bar 31 is likewise held in a horizontal position by upright 28. The lower ends of uprights 27 and 28 are attached to frame 59 which also supports conveyor 12.

In operation, the nozzle 14 of guns 13 are directed at container 11. Heater air carrying coating material leaving nozzle 14 inpinges container 11 and deposits a coating thereon.

Although a four gun unit is shown in FIG. 4, arrangements having greater or fewer guns is suitable. FIG. 5, for example, shows one arrangement for supporting two guns in a coating position.

Even with a two gun coating unit, better coatings and coating efficiencies can be obtained with Sn Cl$_4$ than with any prior art method. In addition, the inventive coating device can effectively and efficiently utilize Ti Cl$_4$ as the coating material which was not possible using prior art methods. For example, two types of hood coaters used in the prior art and a four gun coating unit and a two gun coating unit in accordance with this invention were compared. Glass bottles were coated with Sn Cl$_4$ on each of the four coaters and the reflectivity of the coatings, which is an indication of coating thickness, was compared with the consumption in pounds per 24 hours of Sn Cl$_4$ by each unit. The results are shown in Table 1.

TABLE I

| Vapor Hood Coater "A" | 4 Gun Unit | 2 Gun Unit | Vapor Hood Coater "B" |
|---|---|---|---|
| Consumption Sn Cl$_4$/lbs/24 hrs | 22 | 15 | 10 | 20 |
| Average Film Reflectivity | 7 | 8 | 8 | 7 |

The table shows that the higher reflectivities result from a coating made using the gun units of this invention while less material was used. The higher reflectivities indicate a slightly thicker film.

In addition, the gun units use less than one-half of the compressed air required for the vapor-hood type coaters and the initial cost of the gun-type coater is less than one-third of the cost of the vapor-hood type coater and maintenance is less costly. The vapor hood type units also show a large built up of coating materials on the inside of the hood; whereas, considerably less build up is encountered in the gun-type coater.

The vapor-hood type coater requires means for raising the hood if an article to be coated becomes blocked in the hood. These blockages are substantially more frequent than with the gun coater because it is necessary for the entry ports which carry the vapors to the hood to be about two inches from the article to be coated. These close tolerances do not provide adequate space for a bottle or other article to freely leave the hood if it accidentally falls over or becomes misaligned.

If the ports are placed at a distance farther from the article to be coated, efficiency falls off drastically. With the gun coater herein disclosed much larger distances from the article are permissible and in the above example, a distance of about four inches between the gun and the article was maintained. If desirable, increased distances between the gun and the article can be used and distances of 6 inches or more are acceptable.

Due to the inefficient utilization of the coating material in the hood type coater, more coating material is wasted and large volumes of air are necessary to remove unused vapors from the vapor hood. In addition, these vapors would cause a pollution problem if vented to the atmosphere and it is therefore necessary to scrub the vapors from the air which carries them from the hood. This problem is minimized when the flameless gun coater herein disclosed is used. Because of the substantially higher efficiencies, the quantities of unreacted vapors are sharply reduced thus reducing the quantity of air needed to remove vapors and reducing the problem of cleaning the air before venting to the atmosphere.

While not wishing to be bound by any particular theory, it is believed that the inefficiency of the vapor-hood type coater is because a large proportion of the vaporized coating material does not reach the surface of the article to be coated. The vapors are introduced at low velocities and temperature, linger in the hood and are finally exhausted. As previously discussed, the flameless gun type coater herein disclosed directs the coating material at the article to be coated at a substantially higher temperature and velocity than the vapor hood type coater. These higher temperatures and velocities contribute to the high efficiency of the apparatus.

Vapor hood coaters are manufactured so that the coating chamber under the hood becomes saturated with coating vapor. In order to saturate the coating chamber with vapor, a plurality of ports for carrying coating material into the chamber are provided. These ports generally have about a 1/16 inch diameter and generally at least 100 such ports are provided and 200 ports is common. With 100 such ports, 200 cubic feet per hour of dry compressed gas such as air is required to obtain a gas velocity of about 25 ft/sec through 1/16 inch ports in a unit having only 100 such ports whereas in the coating unit herein disclosed only 50 cubic feet per hour of dry gas is necessary to obtain a velocity of over 40 feet per second through a nozzle having a ¼ inch diameter. In order to approach this velocity through the ports, the vapor hood coater would have to use over 300 cubic feet per hour of dry gas which is six times the amount required to operate the flameless gun coating unit. Such high requirements for dry compressed air are unacceptable due to heavy loads or the air dryer and increased problems in cleaning pollutants from the increased volume of air. It is apparent that two such gun units can operate on less than one-half the dry compressed gas required for the vapor hood coater. It is believed that, the high velocity from the gun unit causes the coating material to impinge the surface of the article to be coated, thus increasing the chances for reaction of the coating material with the surface of the article, which in turn contributes to increased efficiency and permits a greater distance between the gun and article than was possible in the vapor hood coater between the wall and the article.

As previously mentioned, the dry gas passing through the gun is usually heated to initial temperatures in excess of 1,500°F, and is generally above 300°F at the surface of the article. The high temperature reduces the possibility of thermal shock which could cause stresses and crazing. These high temperatures likewise seem to contribute to the superior efficiency of the gun unit over the prior art vapor hood type of unit. Table number two indicates the drop in coating thickness on the article as the temperature of the issuing air is decreased. The temperature of the article was maintained at a temperature of about 600°F and the gas temperature was measured one-fourth of an inch from the gun nozzle.

TABLE NO. 2

| Gas Temperature | Coating Thickness |
| --- | --- |
| 1000°F | 100 A |
| 400°F | 73 A |
| 70°F | 65 A |

The material used was tin tetrachloride. The vapor hood coaters in the prior art did not pre heat the gas such as air which carried the coating material to the hood. The advantages of heating the air were therefore not realized.

The coating thicknesses are measured by variations in reflectivities which are correlated to the film thickness. In measuring the coating thickness, a light source is reflected from the surface of the coated glass article to a photocell. The current induced in the photocell is then read on a micro ampere meter. The readings on the micro ammeter are then correlated to film thickness upon the glass article by using glass articles having a known coating thickness determined by X-Ray diffraction methods.

Numerous organic and inorganic metallic compounds can be used as coating material in the gun. For example, almost any compound of a metal which will pyrolyze at a temperature below the temperature of the heated gas in the gun can be used. While not wishing to be bound by any particular theory, it is believed that the pyrolysis of the compound will form an intermediate which is believed to be metal or metal ions which seem to react upon the surface of the vitreous article to be coated to form metal objects.

Examples of metal organic compounds which have been used successfully are tetra isopropyl titanate and tetrabutyl titanate. Among the more useful metal inorganic compounds which have been used for coating vitreous articles are tin tetrachloride and titanium tetrachloride. Tin tetrachloride has been used extensively in coating vitreous surfaces mainly because the reaction rate of tin chloride with ambient humidity is slower than the reaction rate of titanium chloride with ambient humidity, thus problems encountered with hydrolysis product of the coating material were reduced when tin chloride was used. Problems caused by hydrolysis product include clogging of equipment, unwanted solid deposits on the vitreous article, acidic products which caused corrosion and loss of efficiency due to wasted coating material which entered the hydrolysis reaction. In addition, in prior art coaters, due to hydrolysis, the thickness of a coating formed by using titanium tetrachloride compared to the thickness of a coating formed by using tin tetrachloride fell off rapidly as the distance from the nozzle of the coater to the article was increased. The rapid decrease in the thickness of the titanium coating was apparently due to increased hydrolysis of the titanium tetrachloride as it traveled the increased distance from the nozzle to the article to be coated, consequently titanium tetrachloride could not be effectively used in higher prior art coaters. Tin chloride also has a high vapor pressure and can be applied in vapor form at ambient room temperature; whereas, titanium tetrachloride to be effectively used should be vaporized at a temperature above ambient room temperature to compensate for the lower vapor pressure of titanium tetrachloride.

The use of tin chloride, however, has several serious disadvantages which would make titanium coating advantageous if the hydrolysis problem of titanium tetrachloride could be solved.

Tin forms an electrically conductive film on vitreous surfaces which increases problems of corrosion such as pinholing and cap rusting; whereas, a coating formed using titanium reduces or eliminates corrosion problems.

Titanium tetrachloride is substantially less expensive than tin tetrachloride and unused titanium compounds can be more easily removed from waste gases such as those passing through the hood over the coater thus problems in preventing pollution are reduced by using titanium.

It has been discovered that the apparatus herein disclosed can utilize titanium tetrachloride without hydrolysis problems. It is believed that the gun coating apparatus can use titanium tetrachloride without hydrolysis problems for several reasons. The high velocity through the gun decreases the time for reaction of the titanium compound with water between the time when the compound leaves the gun to the time when the compound strikes the vitreous article to be coated. The high temperature in the gun prevents the formation of stable hydrolysis compounds before the titanium leaves the gun. As previously discussed the temperature in the gun is in excess of 1,000°F; whereas, the highest gas temperature, other than flame coaters, used in delivering the coating material was about 200°F.

Flame coaters, as previously discussed, deliver the coating material at a high temperature and velocity but do not alleviate the problem of hydrolysis of coating compounds such as titanium tetrachloride. When flame coaters are used, a usual product of combustion is water vapor which will rapidly combine with compounds such as titanium tetrachloride to form hydrolysis products.

What is claimed is:

1. A method for coating a vitreous surface comprising:
    heating a high velocity gas stream to a temperature of from about 700°F to about 1,800°F;
    blending with the hot gas stream a metallic compound which decomposes at a temperature between about 700° to 1,800°F; and
    impinging a vitreous surface preheated to a temperature of from about 400°F to about 1,800°F with the blended gas stream whereby said compound becomes decomposed and forms a coating on said surface.
2. The method of claim 1 wherein said metallic compound is vaporized in a carrier gas stream prior to said blending step.

3. A method for coating surfaces manufactured from vitreous substances comprising:
   introducing a coating material selected from the group consisting of Ti Cl$_4$ and Sn Cl$_4$ into a hot air stream, said hot air stream being at a temperature of between 700° and 1,800°F; and
   directing said air stream at said surface, said surface being at a temperature of from about 400°F to about 1,800°F.

4. The method of claim 3 wherein said air stream is heated by an electrical resistance heater.

5. The method of claim 3 wherein said coating material is introduced into said hot air stream by means of a feed air stream carrying said coating material in vapor form.

* * * * *